Jan. 3, 1928.
S. H. HEIST
1,654,647
METHOD OF MAKING HOLLOW ARTICLES
Filed July 23, 1921
7 Sheets-Sheet 1
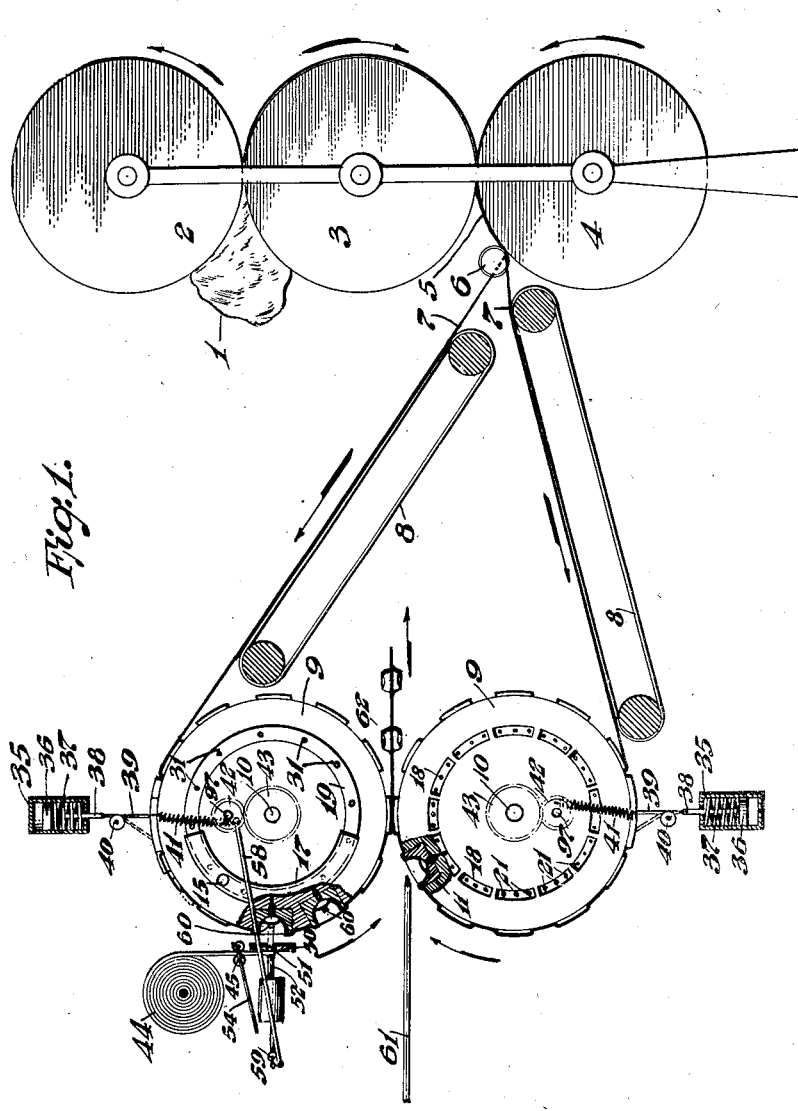
INVENTOR
Stuart H. Heist.
BY
Niederohein Gambon
ATTORNEYS

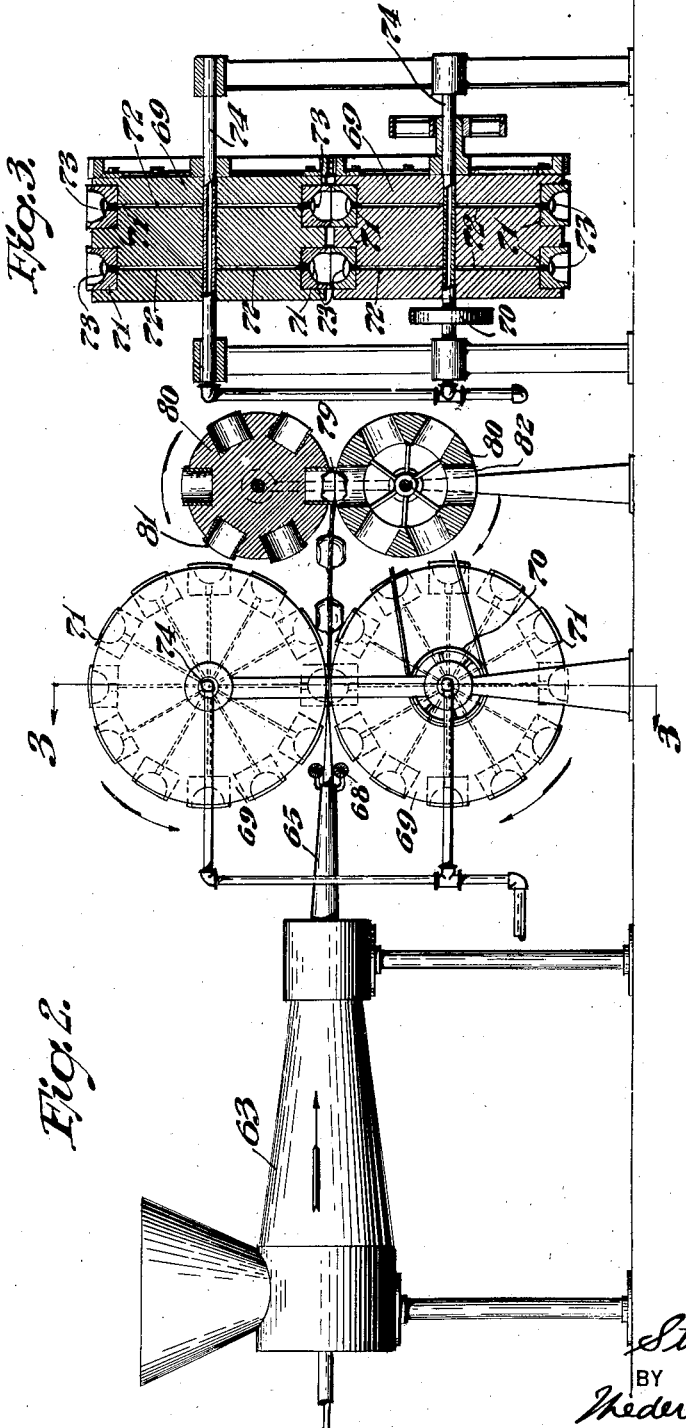

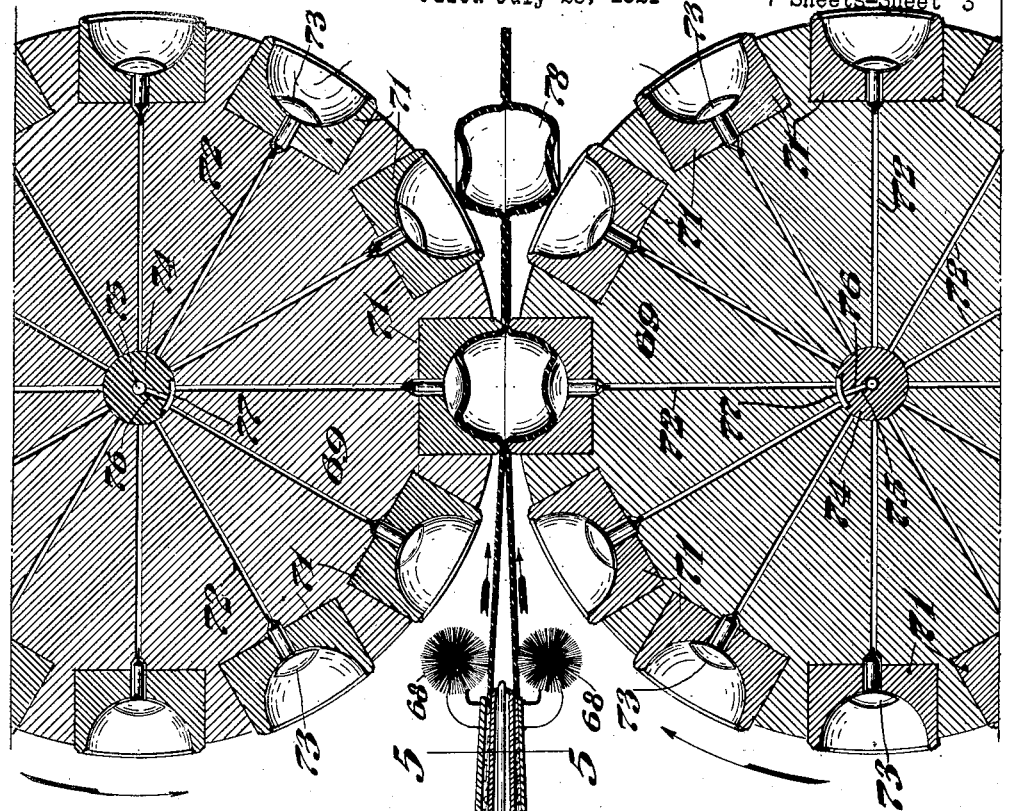
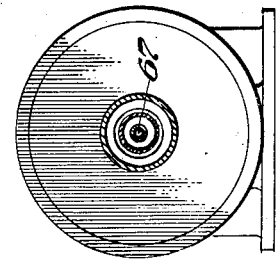
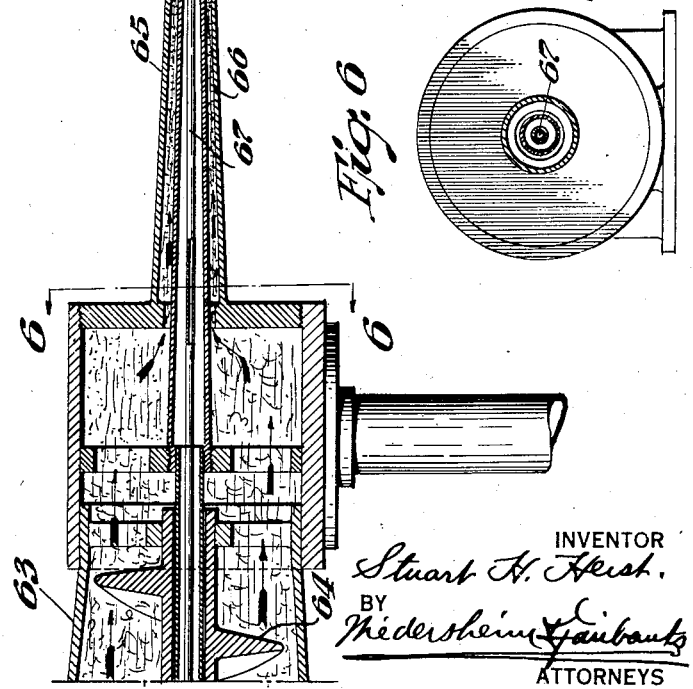

Jan. 3, 1928.
S. H. HEIST
1,654,647
METHOD OF MAKING HOLLOW ARTICLES
Filed July 23, 1921  7 Sheets-Sheet 4
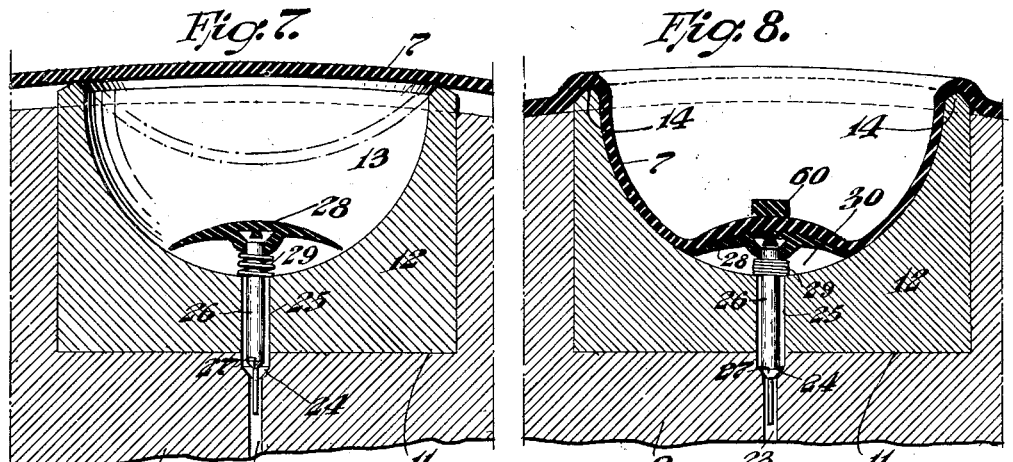
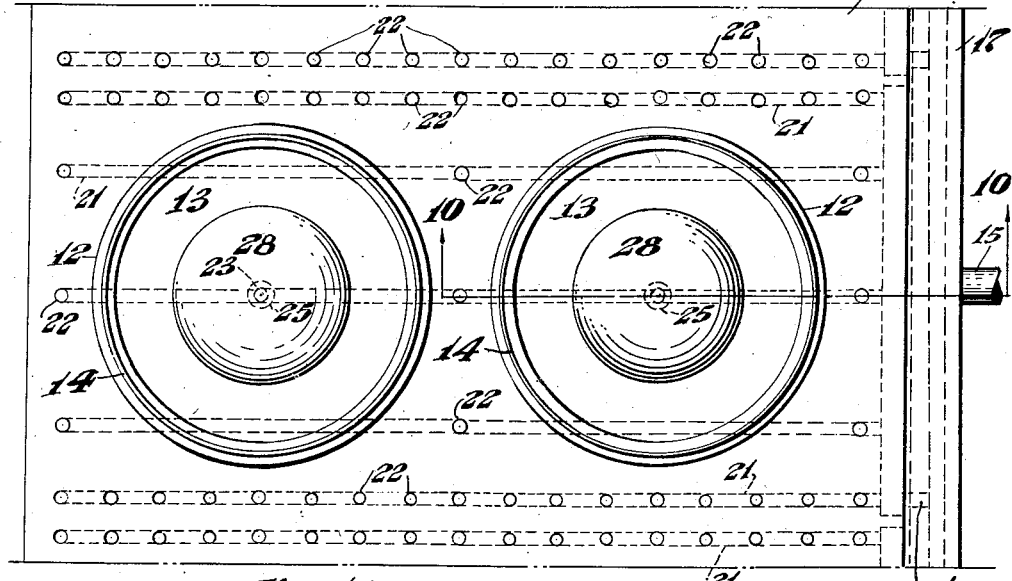
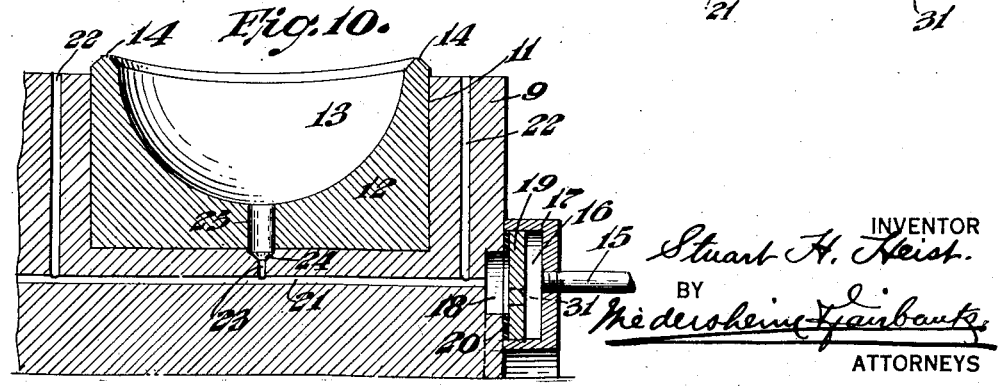
INVENTOR
Stuart H. Heist.
BY
ATTORNEYS

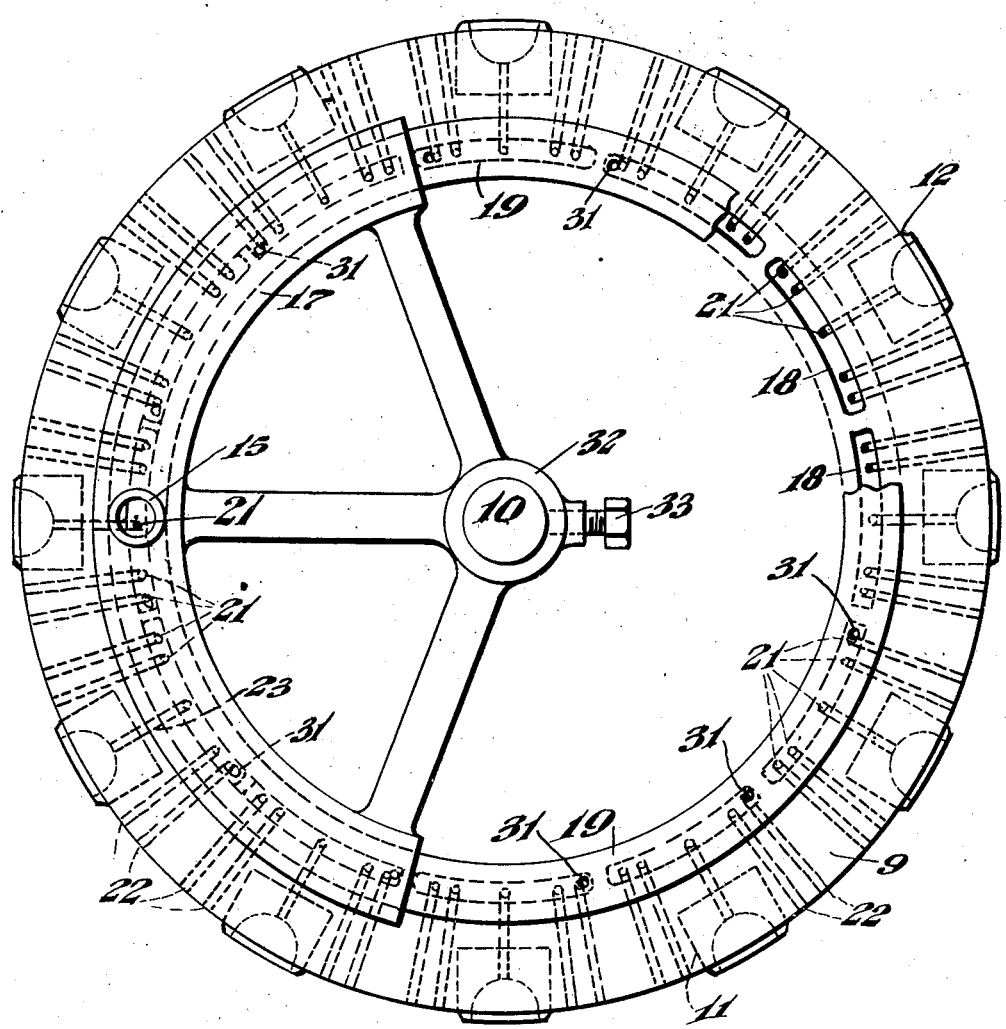

Jan. 3, 1928.
S. H. HEIST
1,654,647
METHOD OF MAKING HOLLOW ARTICLES
Filed July 23, 1921    7 Sheets-Sheet 6
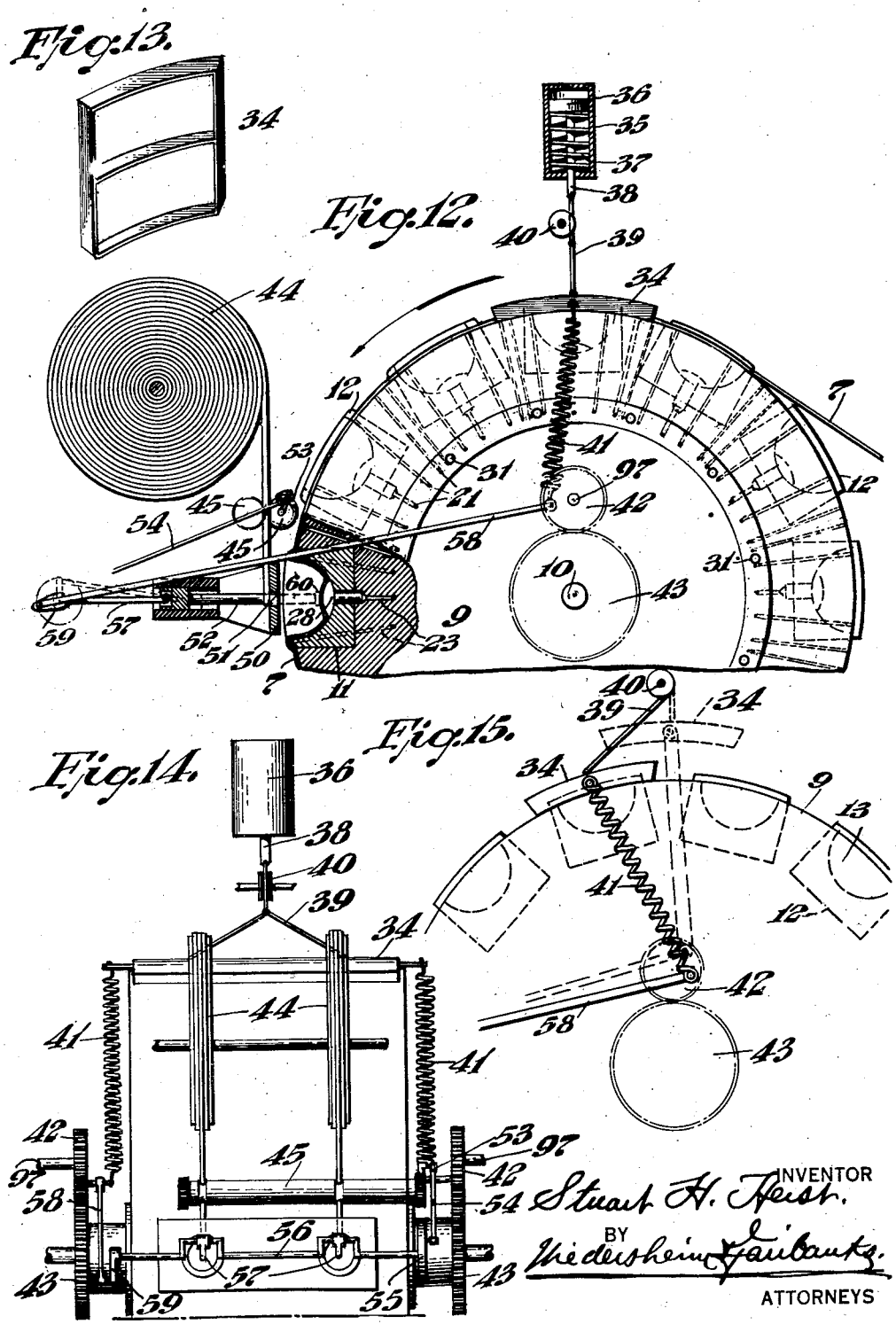

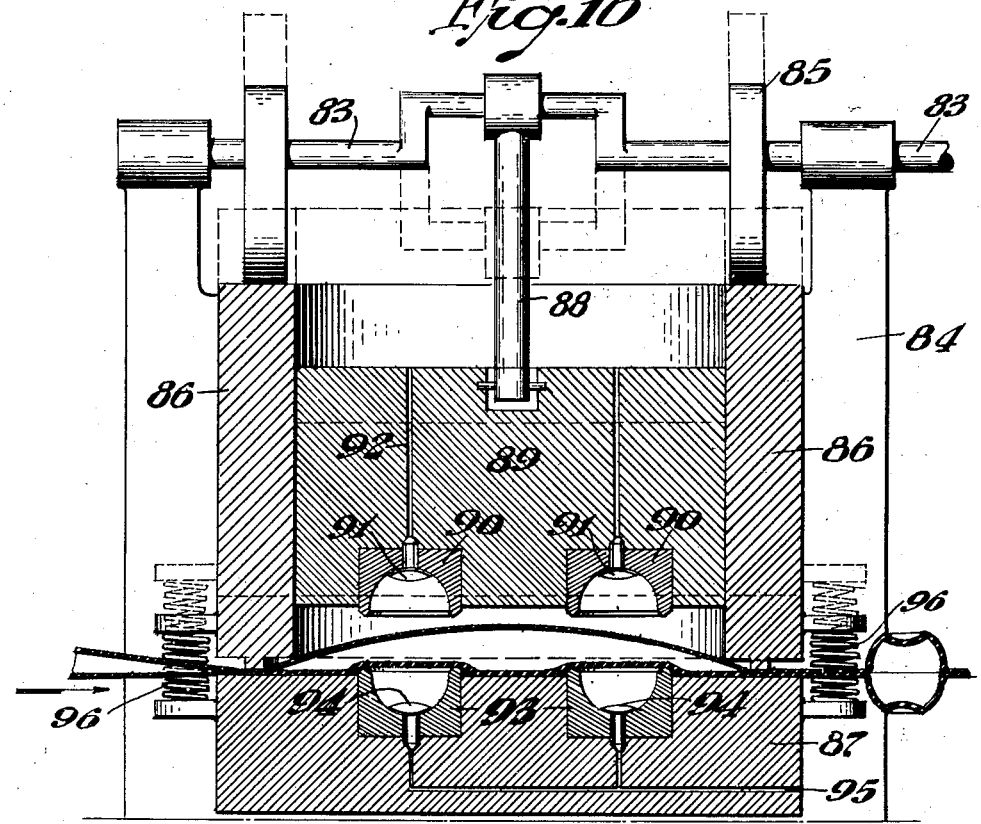
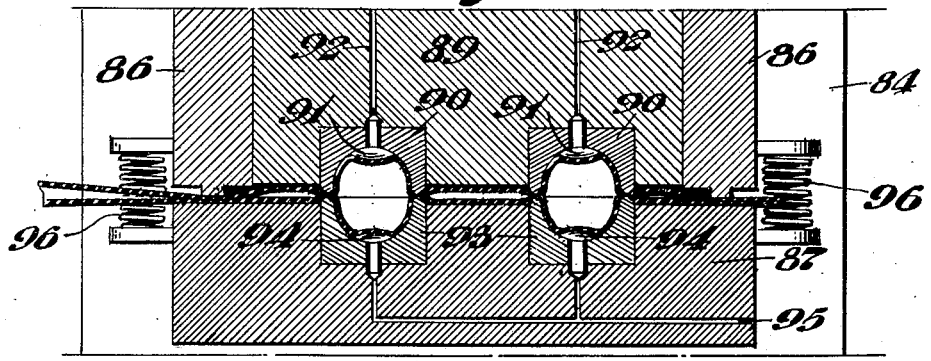

Patented Jan. 3, 1928.

UNITED STATES PATENT OFFICE.

STUART H. HEIST, OF PENLLYN, PENNSYLVANIA, ASSIGNOR TO PENN RUBBER PRODUCTS CORPORATION, OF PHILADELPHIA, PENNSYLVANIA, A CORPORATION OF DELAWARE.

METHOD OF MAKING HOLLOW ARTICLES.

Application filed July 23, 1921. Serial No. 486,998.

My present invention in its broad and generic scope comprehends a novel method of and apparatus for producing articles from material of a plastic nature or capable of being made plastic, the material being in the form of an open or closed sheet from which the articles are formed during the travel of such sheets.

Although not limited to such use, it is especially designed for the manufacture of hollow rubber articles. The blanks formed by the sheets are continuously fed across the mold cavities of continuously moving molds, the cavities of which are brought into register during the rotation of the molds to effect the joining of the article sections, prior to which material either in a liquid or a solid form is introduced into an article section in order that the article will maintain the proper formation during the vulcanization of the article.

It further comprehends a novel method of and apparatus for producing hollow articles wherein the suction is applied to the blank sheets prior to or simultaneously with the action of retaining the sheets around the mold cavities of the movable molds, so that the blank is drawn into and retained in the mold cavities.

It further comprehends novel means for automatically securing a sealing plug in a definite location in an article section.

It further comprehends novel means for severing the articles, which are commonly called biscuits, from the blank sheets or tube from which they are formed.

It further comprehends a novel construction and arrangement of a press which can be advantageously employed in forming the article sections and joining them together.

It further comprehends a novel construction and arrangement of molds which are constructed in such a manner that a uniform thickness of wall is obtained in the finished article.

It further comprehends a novel construction and arrangement of an apparatus for carrying out the various steps of the method.

Other novel features of construction and advantage will hereinafter more fully appear in the detailed description.

For the purpose of illustrating my invention, I have shown in the accompanying drawings embodiments thereof which are at present preferred by me, since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents diagrammatically a novel construction and arrangement of mechanism whereby my method can be carried out in practice.

Figure 2 represents diagrammatically another construction and arrangement of an apparatus for producing hollow articles, by which my method can be carried out in practice.

Figure 3 represents a section on line 3—3 of Figure 2.

Figure 4 represents, in sectional elevation and on an enlarged scale, a portion of the construction seen in Figure 2.

Figure 5 represents a section, on line 5—5 of Figure 4.

Figure 6 represents a section, on line 6—6 of Figure 4.

Figure 7 represents a section through a mold and mold cavity, showing the position the stock assumes prior to the application of the suction.

Figure 8 represents a section similar to Figure 7, but showing the stock in the position which it assumes after the suction has been applied.

Figure 9 represents a top plan view of a portion of a mold employed.

Figure 10 represents, in section, a portion of a roll and a mold, showing more particularly the manner in which suction is applied.

Figure 11 represents an end view of one of the rolls.

Figure 12 represents an end elevation, partly in section, of a roll and certain of its adjuncts, showing on an enlarged scale certain of the parts seen in Figure 1.

Figure 13 represents, in perspective, a clamping member which may be employed if desired.

Figure 14 represents, in front elevation, a portion of the construction seen in Figure 12.

Figure 15 represents diagrammatically a portion of the construction seen in Figure 12, showing certain of the parts in a different relation from that seen in Figure 12.

Figure 16 represents, in sectional elevation, a press which can be employed.

Figure 17 represents, in section, a portion of the press, showing the position certain of the parts assume when the mold members are brought together Similar numerals of reference indicate corresponding parts.

Referring to the drawings,

In accordance with my present method and apparatus, I form the articles by a continuous operation, the blanks in the form of sheets or a blank in the form of a tube being fed directly over the moving mold cavities, and the article sections being automatically formed therein and joined during the movement of the mold. In case hollow rubber articles are to be manufactured, I take the blank in the form of sheets preferably directly from a calender or the blank in the form of a tube preferably directly from a tubing machine, such calender and tubing machine being of any desired or conventional construction.

I will first explain a construction which can be employed in carrying out my method when the blank is drawn from the calender in one or more sheets, reference being directed more particularly to Figures 1 and 7 to 15 inclusive.

Referring now more particularly to Figure 1, 1 designates the stock which passes between the rolls 2, 3 and 4 of the calender in a sheet 5 which is severed in any desired manner, for example, by means of a rotating cutter 6, so as to form the upper and lower sheets 7. These sheets are supported by traveling belts or conveyors 8 which feed them to the rotatable rolls or mold supports 9 carried by shafts 10, suitably supported. The rolls 9 are recessed in their periphery to form a desired number of mold recesses 11 which receive the molds 12 having the cavities 13 therein, the wall surrounding the upper portion of the mold cavities being reversely inclined, as at 14. The rolls 9 are intergeared or provided with other means for effecting their rotation in a reverse direction to each other, so that at the proper time the mold cavities in one rotatable mold are brought into register with the mold cavities of the other rotatable mold. The outer portions of the molds extend beyond the peripheries of their respective rolls, as will be understood by reference to Figures 7, 8 and 10.

*Suction producing mechanism.*

15 designates a pipe leading from a suction creating device, not shown, to a chamber 16 in a stationary plate 17. Each roll 9 is provided in its side wall with a series of curved chamber forming slots 18 which are covered by means of a ring 19 secured to the roll 9 in any desired manner. Interposed between this ring 19 and the roll 9 is packing material 20. These passages 18, as will be understood from Figures 9, and 11, extend only the distance of one row of mold cavities and communicate with laterally extending passages 21 which open through the periphery of the roll by means of a series of apertures 22.

The passages 22 communicate with passages 23 which are each provided with a valve seat 24 and communicate with a passage 25 passing through the bottom of each mold and communicating with its cavity 13. 26 designates a valve having a valve face 27 to co-operate with its valve seat 24. The valve 26 at its upper end is connected to a flexible head 28 which may be made of any desired material and which is rounded on its upper face. The head 28 has interposed between it and the lower wall of the mold cavity 13 a spring 29 which normally keeps the valve 27 away from its seat. The valve head 28 is preferably made of flexible material such as, for example, vulcanized rubber or spring metal, and when in raised position it is out of contact with the wall of the cavity 13, as will be understood by reference to Figure 7.

It will be seen that, when the suction is applied, the rubber stock will be drawn downwardly around the walls of the mold into close contact therewith, and the central portion will rest on the valve head 28. As soon as the air is withdrawn from a mold cavity, the valve is drawn down together with the valve head and the valve closing against its seat 24 causes the air to be trapped within the chamber 30, see Figure 8, so that this trapped air contributes with the spring to effect the loosening of a formed section from the mold cavity. The rubber is thicker above the valve head than is that portion which engages the walls of the mold, so that when the section assumes its final form in the vulcanizing mold it will have a uniform thickness of wall, instead of being thinner at the poles, as would otherwise occur.

Each ring 19, which is carried by its roll 9, is provided with a series of ports 31 which are positioned in such a manner that they will register with the first passage 21 of a mold unit, as will be understood from Figure 9, from which it will be seen that these mold sections or, in other words, each row of mold cavities as a unit has five laterally extending passages 21, and, as soon as the vacuum acts upon one of them, it communicates with all of them.

The plate 17 is provided with a hub 32 which is adjustably mounted on the shaft 10 in any desired manner, see Figure 11, for example, by means of the set screw 33, in order that the suction plate 17 may be adjusted to vary the time at which the suction is admitted to and cut off from each mold unit during the revolution of the molds.

Referring now more particularly to Figure 1, it will be seen that the sheets 7 pass around their respective roll 9, so that during their travel they cover the mold cavities contained in a desired portion of the periphery of a roll. Subsequently to or simultaneously with the suction being admitted to the passages 21, I may, if desired, retain the sheets of rubber in contact with the outer faces of the molds and also if desired with the outer periphery of the rolls around the mold cavities. This can be accomplished manually by the operator by pressure of his hand, or by a pressure against the sheet by suction as shown, or by a mechanically actuated retaining member, as shown, or by any combination of such means.

In Figures 1 and 11 to 15 inclusive, I have shown one form of retaining mechanism which can be employed, if desired.

34 designates a pressure member in the form of a skeleton frame, the cross members of which are curved to conform to the shape of the roll. 35 designates a casing supported in any desired manner and in which is mounted a plunger 36 between which and the bottom of the casing is interposed a spring 37. The plunger 36 has connected to its rod 38 a cable 39, which engages a pulley 40 and is connected to the pressure member 34. The pressure member 34 is drawn downwardly by means of springs 41 connected at their upper ends to the pressure member and eccentrically connected at their lower ends to the gears 42 which are intergeared with the gears 43 which latter are fixed to the rolls 9 in order to revolve therewith. The gears 42 are supported on a stationary shaft 97 carried in any desired manner by the framework. The ratio between the gears 42 and 43 is in direct ratio with the number of rows of cavities employed in the rolls, for example, if there are twelve rows of mold cavities around the periphery of the roll the ratio between the gears 42 and 43 would be one to twelve.

It is necessary in the manufacture of certain types of hollow articles which are inflated after vulcanization to have a plug of unvulcanizable rubber adhering to the inner periphery of the article, and, for this purpose, I employ a novel construction and arrangement of plugging mechanism which is automatic in action and operates in timed relationship to the other movements. The plugging mechanism comprises rolls 44 of stock which may have any desired shape in cross section and from which rolls the stock is fed by means of grooved feeding rolls 45 across the face of a die 50, each die having openings 51 through which are adapted to pass the punches 52. The feed rolls are intergeared, and one of them is provided with a pawl and ratchet 53, the pawl of which is actuated by a rod 54 connected to an eccentric 55 on a shaft 56 mounted in any desired manner, and which is operatively connected with the punches 52 by means of connecting rods 57. As illustrated, the shaft 56 is driven from a gear 43 by means of a rod 58 and a rock arm 59. As a row of mold cavities comes into register with the die openings 51 the parts are timed so that the punches 52 will move forwardly and sever plugs 60 from the stock passing from the rolls 44 and press them against formed sections within mold cavities. On the rearward stroke of the punches 52 the pawl is actuated to advance the ratchet and thereby the stock passing from the rolls 44, so that it is in position for the punches to sever plugs therefrom. The sheets 7, as seen in Figure 1, pass around the rolls 9, and I provide means for placing in a formed section means for effecting the expansion of the article during vulcanization. In order to illustrate one manner of accomplishing this result, I have shown a pipe 61 through which is introduced into an article section, as it comes into proper position, water or a chemical which will expand under the action of heat.

As a row of cavities of each roll comes into register, the suction is cut off and the edges are joined together to form the biscuits 62 which adhere to the sheets. These biscuits are severed from the sheets in any desired manner, and this can be accomplished if desired during the joining of the juxtaposed edges of an article section or, as illustrated in Figure 2, as will be hereinafter explained.

Referring now more particularly to the embodiment seen in Figures 2 to 6 inclusive, I have illustrated the manner in which the articles are formed ready for vulcanization when the blank is taken from a tubing machine. In this embodiment, 63 designates a tubing machine of any desired or conventional type. The rubber is fed through the tubing machine by means of a screw 64 and is discharged through the spout 65 in tubular formation, see Figure 5, being formed around the hollow mandrel 66, serving as an air pipe, and within which is located a water pipe 67, the air and water pipes passing through the hollow shaft of the screw. As the tube passes from the tubing machine, it is substantially in the form seen in Figure 5 in cross section, and passes between dusting rolls 68 which apply powder thereto. 69 designates the moulding rolls which are intergeared to revolve in a reverse direction to each other, and one of which is driven in any desired manner, for example, by means of a pulley and belt arrangement 70, see Figure 2. The rolls 69 have inserted in their peripheries a desired number of molds 71 having cavities as described and provided with suction passages 72 which are controlled by means of a valve arrangement 73 similar to that already described in Figures 7 and 8, so that a further detailed description is unnecessary. The rolls 69 are each mounted on a shaft 74 having a passage 75 through it, which communicates with a suitable source of suction, and is provided with a desired number of ports 76 which open into a circular slot 77 in its periphery, so that a chamber is formed which communicates with the passages 72 at predetermined times in the rotation of the rolls 69, the shafts 74 being stationary. As the tube engages the faces of the molds, the suction is automatically applied so that the tube is drawn into the mold cavities, assuming the form seen in Figure 4, and the outer faces of the mold cavities join the sheets together, the suction being cut off as this action takes place. By limiting the supply of air to the interior of the tube, a partial vacuum will be formed in the biscuits. The biscuits 78 now travel through the biscuit severing mechanism 79 which consists of intergeared rolls 80, into one of which are inserted the tubular cutting knives 81 while the other roll is provided with the apertures 82 from which the severed biscuits are discharged through an open end of such mold in a condition ready for vulcanization.

The biscuits can also be formed by a pressing operation as will be now described, reference being directed to Figures 16 and 17.

In this embodiment seen in Figures 16 and 17, the blank comes from the tubing machine and is fed into the press, which has a driving shaft 83, journalled on the press frame 84, and provided with cams 85, which actuate the annular clamping member 86 against the bottom stationary mold support 87. Springs 96 are interposed between the member 86 and the stationary mold support 87 to retain said member 86 at all times in contact with its actuating cam. The shaft 83 is in the form of a crank shaft to which is connected a connecting rod 88 pivotally connected with the upper mold support 89 which is provided with molds 90 having valve mechanism 91, as explained in connection with Figures 7 and 8, and having a passage 91 communicating in any desired manner with a source of suction supply. In a similar manner, the stationary mold support 87 has molds 93 provided with valve mechanism 94 controlling the suction line 95.

The operation of my novel apparatus for producing hollow articles and the manner in which the method is carried out in practice will now be readily apparent to those skilled in this art and is as follows:—

As will be understood from the detailed description, my method can be carried out by the employment of many different types of mechanisms, and I have illustrated and described a few of such types which can be advantageously employed.

Referring first to Figure 1 and Figures 7 to 15 inclusive, I will first describe the operation as the different steps occur when the blank is formed from a calender. As seen in Figure 1, the raw stock passes through the calender in the form of a sheet 5 which is cut into a plurality of sheets by means of a cutter mechanism 6 of any desired type. The two sheets 7 thus formed are fed by traveling conveyors 8 to superimposed rotatable rolls 9 which are intergeared to revolve in opposite directions.

The rolls 9 can be fed either continuously or intermittently, but are preferably fed continuously so that the sheets 7 will be drawn around the co-operating rolls 9. The stationary plate 17 is adjusted so that the suction will be applied slightly before or simultaneously with the sheet covering a row of mold cavities of each mold, so that at the same time the air will be exhausted from under the entire sheet around the mold cavities. As the sheets pass beneath the sheet retaining members 34, these retaining members 34 are drawn toward their respective rolls by the action of the springs 41 which are actuated by the gears 42 meshing with the gears 43 and rotating in unison with the rolls 9 to which they are connected.

As the rolls 9 continue to revolve, the retaining members 34 will move from the position seen in Figure 12 into that seen in Figure 15, thereby exerting a downward pull on the cables 39 and the plunger rods 38 against the action of the springs 37, and when the rolls assume the position seen in Figure 15 the springs 37 cause the retaining members 34 to be withdrawn from contact with the sheets and to assume their normal inoperative position out of contact with the sheets.

The suction is now acting to draw a portion of the blank forming sheets above the row of mold cavities into such mold cavities, and retain them therein. As the stock from the blank is drawn into a mold cavity, it will be seen that the suction is applied between the valve head 28 and the juxtaposed wall of the mold cavities, so that the rubber stock is drawn downwardly into contact with the wall of the mold cavity above the valve head, the central portion resting directly on the valve head and being of substantially the same thickness as the thickness of the rubber sheet, while the rubber contacting with the wall of the mold cavity is of a somewhat reduced thickness. Each valve 26 is now drawn downwardly carrying with it the portion of the rubber stock which rests on it, and the valve head 27 closes against its seat 24, so that air is trapped in the chamber 30 which contributes with the springs 29 to release the article or biscuit sections at the proper time.

The continuous revolution of the rolls brings each row of mold cavities on one roll into register with a plugging mechanism, which is the next step of the operation.

*Plugging operation.*

The plugging mechanism is so timed that, on a rearward stroke of the punches 52, the feed rolls 45 will be actuated to feed the unvulcanizable stock coming from the rolls 44 across the openings 51 in the die 50. The connecting rod 58 driven by the gear 42 rotates the crank shaft 56 at the proper time to cause the punches 52 to sever plugs 60 from the stock and bring them into contact with the inner face of an article section. The stock is of such a nature that it will adhere to the ends of the punches, but as soon as it comes into contact with the rubber stock of an article section, which is of a more adhesive nature, it will be retained in proper position in the article section as the return strokes of the punches are effected.

The article sections, as before explained, are formed in such a manner that they are not of a true hemispherical form, and in order that they will have, in the final article, a wall of substantially uniform thickness, I provide means for inserting material which will have an expansible action when the articles are being vulcanized, and for this purpose, I provide a pipe 61 through which water or chemical, which will expand under heat, is inserted in an article section prior to its being connected with another article. This pipe 61 is preferably automatically controlled, but may be manually controlled if desired. The rolls 91 continue to revolve so that the cavities of one row on one roll are brought into register with the cavities in a row of the other roll, and as the molds extend beyond the peripheries of their rows a seam is automatically formed around each article, the juxtaposed edges of which are joined together by the pressure exerted by the molds against the sheets of rubber. It will be seen that the two thicknesses of the sheets around the edges of the mold cavities are thus pressed into a single sheet or a single thickness by a rolling pressure, so that a very strong seam is produced. The seam is really stronger than the thickness of the wall at any other point on the periphery of the article, as the rubber at the seam forms a homogeneous mass which is stronger than any other portion of the biscuit.

The plate 17 is adjustable, so that the suction is cut off prior to the sealing of the juxtaposed edges of the article sections. The biscuits which have been formed are now carried by the sheets as will be understood by reference to Figure 1, and they are cut out of the sheets in any desired manner, preferably automatically as shown in Figure 2, from which it will be understood that as the sheets pass between the rolls 80 the tubular cutting knives 81 sever the biscuits, which drop down through the openings 82 into the interior of the lower roll 80, from which they are discharged through an open end thereof. The biscuits are now ready for vulcanization, which is carried out in the usual manner, the biscuits being placed in vulcanizing molds and vulcanized.

I will next describe the operation if the blank is taken directly from a tubing machine in a tubular form, reference being directed more particularly to Figures 2 to 6 inclusive. As the rolls 69 revolve, the passages 72 are brought into register with the slots 77, so that when the rolls reach a predetermined position suction is automatically applied. I may introduce air through the shaft of the screw 64 into the tube as it passes from the tubing machine, and also water or a gas forming chemical.

As the suction on the chambers formed by the slots 77 through the passages 72 draws the rubber stock down into the mold cavities, a vacuum would be created within the sections which are being molded unless a sufficient amount of atmospheric air is present to prevent the formation of such vacuum within the article, as otherwise a substantially complete vacuum within the article would prevent the stock being drawn down into contact with the molds in the cavities. By limiting the admission of atmospheric air the juxtaposed edges of the article sections are united in a partial vacuum with a partial vacuum entrapped therein. The biscuits are now severed from the sheets in the manner already described by the biscuit severing mechanism seen in Figure 2, and the articles are ready for vulcanization.

Referring now to the embodiment seen in Figures 16 and 17, I will describe the manner in which the biscuits are formed by a pressing operation.

The blank from the tubing machine is intermittently fed through the press and air is admitted through the tube to provide for the formation of the article during its molding and sealing. The annular pressure member 86 seals the tube so that a requisite amount of air is trapped within it, as will be understood by reference to Figure 16, so that when the upper molds 90 are moved downwardly the blank spaces on the mold support will cause such air to be compressed and force the stock into the mold cavities to assume the formation seen in Figure 17 and the closing of the molds forms the seam. Although it is not essential, I may, if desired employ a suction to contribute to draw the rubber stock into the mold cavities the suction being withdrawn through the passages 92 and 95.

It will be apparent from the foregoing that, in accordance with my present invention, the stock in the form of an open or closed sheet is fed preferably directly from its source of production across molds having multiple mold cavities therein, either one or both of the molds being moved in order to automatically form the article sections and seal their juxtaposed edges together to produce the biscuits ready for vulcanization.

It will be apparent that the blank or blanks and the molds may be moved either continuously or intermittently as may be desired in practice. By forming the seam by a rolling contact of the mold sections, I am enabled to employ a much stronger pressure than has heretofore been deemed practical in methods commonly employed, and I am also able to produce a maximum number of biscuits in a minimum amount of time, with a minimum amount of labor and with a consequent decrease in the cost of production, which in some cases is as high as fifty percent of other methods now in use.

I am aware that it is a common right in this art, in view of the patent to Smith #516,028, of March 6th, 1894, to clamp the stock with respect to the mold to exclude the air between the stock and the mold and to cause the stock to be drawn into and retained in the mold cavities by withdrawing the air through apertures in the mold cavities.

I am also aware that it is a common right in this country in view of the British patent to Lund #2891 of Feb. 5th, 1910, to form the stock into the mold cavities by suction and to retain it in such cavities by suction until the juxtaposed edges of biscuit sections are brought together and seamed, and I therefore make no claim to such features.

In so far as I am aware, I am the first in the art to automatically form the biscuit sections in a traveling mold, the stock being fed in a tube of continuous sheets and preferably directly from its source of production, to automatically attach a sealing plug to one section of an article, to insert an expansible medium in one section of an article and to seal the juxtaposed edges of the article by the rolling pressure of registering molds and sever the finished biscuit from the stock; and I therefore desire to have my claims to any and all of such features to receive the broad and generic interpretation to which a pioneer in the art is entitled.

It will now be apparent that, in accordance with my present invention, the stock is fed in sheet form across the cavities of the molds which I have illustrated herein as arranged in rows of two each, but it will be apparent that in practice any desired number of cavities may be contained in a single roll. If the hollow article is of the type which is to be plugged such as, for example, an inflated ball, I attach to one section of an article a plug of nonvulcanizable material.

After the article sections are formed and their juxtaposed edges sealed, the articles are transferred to vulcanizing molds and vulcanized in the usual way, I preferably control the introduction of air to the article sections in such a manner that when the article is formed it has a deformed contour and a partial vacuum is trapped within the ball so that it tends to maintain the deformation of the ball after it is removed from the forming mold. When the articles are placed in a vulcanizing mold, the heat of vulcanization causes the balls to assume the contour of the vulcanizing mold together with the action of the expansible medium entrapped within the ball, so that the finished article has a wall of uniform thickness. The articles can have introduced into them prior to or subsequently to vulcanization fluid under pressure. If this fluid under pressure is introduced subsequently to the vulcanization, it is preferably introduced through the sealing plug and the sealing plug sealed either by pressure on the plug or by the action of a vulcanizable medium within the ball or by a self sealing cement or by any combination of such material.

If a tennis ball is to be made the usual felt covering is secured thereto.

It will of course be apparent that in accordance with my invention the article does not need to have a spherical form but may be of any desired contour.

I preferably take the stock directly from its source of production, but it will be apparent that after coming from the calender it may be on rolls and drawn from these rolls to the molding mechanism. In such case where the rolls of calender stock is fed to the article forming mechanism, such rolls of stock and the forming mechanism may be located within a chamber or room within which a partial vacuum is maintained, so that, when the article sections are sealed, a partial vacuum will be sealed or trapped within each article. As such construction will be clear to those skilled in the art, I have deemed it unnecessary to illustrate it.

It will now be apparent that I have devised a new and useful method of and apparatus for making hollow articles which embodies the features of advantage enumerated as desirable in the statement of the invention and the above description, and while I have, in the present instance, shown and described embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:

1. The method of automatically forming hollow articles, which consists in feeding the stock directly from its source of production in the form of a tube to a traveling mold, and during such feed automatically forming biscuits from the stock.

2. The method of automatically forming hollow articles, which consists in feeding the stock directly from its source of production in the form of a tube across movable mold cavities, forming the stock in such mold cavities to form article sections, bringing the mold cavities into register and forming a seam between the article sections.

3. The method of automatically forming hollow articles, which consists in feeding the vulcanizable stock directly from its source of production in the form of a tube, molding the stock during its feed into article sections of the desired formation, sealing the juxtaposed edges of the article sections, and then vulcanizing.

4. The method of automatically forming hollow articles, which consists in feeding the vulcanizable stock directly from its source of production in the form of a tube, molding the stock into article sections during such feed, attaching a nonvulcanizable plug to one section of the article, bringing the article sections into register and sealing the juxtaposed edges, and then vulcanizing the articles.

5. The method of automatically forming hollow articles, which consists in feeding the stock directly from its source of production in the form of a tube across the cavities of traveling molds, holding the stock across the mold cavities by suction, drawing it into the mold cavities by suction during the travel of the molds to form article sections, and sealing the juxtaposed edges of article sections.

6. The method of automatically forming hollow articles, which consists in feeding the stock directly from its source of production in the form of a tube across traveling molds having multiple cavities, drawing the stock into such cavities during the travel of the molds, inserting an expansible medium into certain of the article sections during the travel of the molds, bringing the article sections into register, and sealing their juxtaposed edges.

7. The method of automatically forming hollow articles, which consists in feeding stock from its source of production in the form of a tube to co-operating rotatable rolls having rows of cavities therein over which the stock travels, applying suction to the cavities during the travel of their molds to draw the stock into such cavities to form article sections, introducing an expansible medium into certain of such sections, and sealing the juxtaposed edges of article sections by the rolling pressure of the molds.

8. The method of automatically forming hollow articles, which consists in feeding stock directly from its source of production in the form of a tube to traveling molds having rows of cavities across which the stock is fed, applying suction to the cavities while retaining the stock over the cavities, introducing an expansible medium into the article sections formed in such cavities, releasing the suction, and sealing the juxtaposed edges of article sections contained in registering rows of cavities.

9. The method of forming an article section, which consists in forming the stock in a mold cavity, supporting the stock at a pole of such cavity until the stock is seated on the side walls of the cavity, and then partially withdrawing the supporting means.

10. The method of forming an article section, which consists in forming the stock in a mold cavity, supporting the stock during such forming at a pole of such cavity until the stock is seated on the side wall of the cavity, and partially withdrawing the stock supporting means and trapping air therein.

11. The method of forming an article section, which consists in forming the stock in a mold cavity by suction, resiliently supporting the stock at a pole of such cavity until it is seated on the side walls of the cavity, and then partially withdrawing the supporting means to increase its tension so that it will contribute to release the formed article section from its mold cavity.

12. The method of forming an article section, which consists in forming the stock in a mold cavity by suction and at the same time supporting the stock at a pole of such cavity until the stock is seated on the side wall of the cavity, then partially withdrawing the supporting means to release the suction and to trap air between the supporting means and the mold.

13. The method of forming a hollow article, which consists in forming the stock in a mold cavity by suction and at the same time supporting the stock at a pole of such cavity until the stock is seated on the side wall of the cavity, then partially withdrawing the supporting means to release the suction and to trap air between the supporting means and the mold and bringing the edges of article sections into register and sealing such edges.

14. The method of automatically forming hollow articles, which consists in feeding stock directly from its source of production in the form of a tube to traveling molds having rows of cavities across which the stock is fed, applying suction to the cavities while retaining the stock over the cavities, introducing an expansive medium into the article sections formed in such cavities, releasing the suction, and sealing the juxtaposed edges of article sections contained in registering rows of cavities by the rolling pressure of the mold.

15. The method of forming hollow articles, which consists in forming article sections and uniting the juxtaposed edges of the sections in a partial vacuum.

16. The method of forming hollow articles, which consists in forming article sections, uniting the juxtaposed edges of the sections in a partial vacuum, and then vulcanizing the articles.

17. The method of forming hollow articles, which consists in taking the stock in the form of a tube from the tubing machine, introducing an expansible medium into the tube, introducing a limited amount of air into the tube, and subjecting the tube to the action of a vacuum to form the article with a partial vacuum entrapped therein.

18. The method of forming hollow articles, which consists in forming article sections from the stock, and uniting the juxtaposed edges of sections with a partial vacuum entrapped therein.

19. The method of forming hollow articles, which consists in forming article sections from the stock, uniting the juxtaposed edges of sections with a partial vacuum entrapped therein, and then vulcanizing the articles.

20. The method of making hollow rubber articles comprising the steps of seating material for the parts of the article by suction and shutting off the action of the suction by movement of part of the material being seated.

21. The method of making hollow rubber articles comprising seating, by suction, parts of the article in cavitary moulds having suction passageways with valves and causing the seated stock as it comes to its seat to close the suction valve.

STUART H. HEIST.